July 3, 1962 J. G. ARGANBRIGHT ET AL 3,041,854
REFRIGERATION SYSTEM FOR HEAT EXCHANGERS
Filed April 15, 1957 6 Sheets-Sheet 3
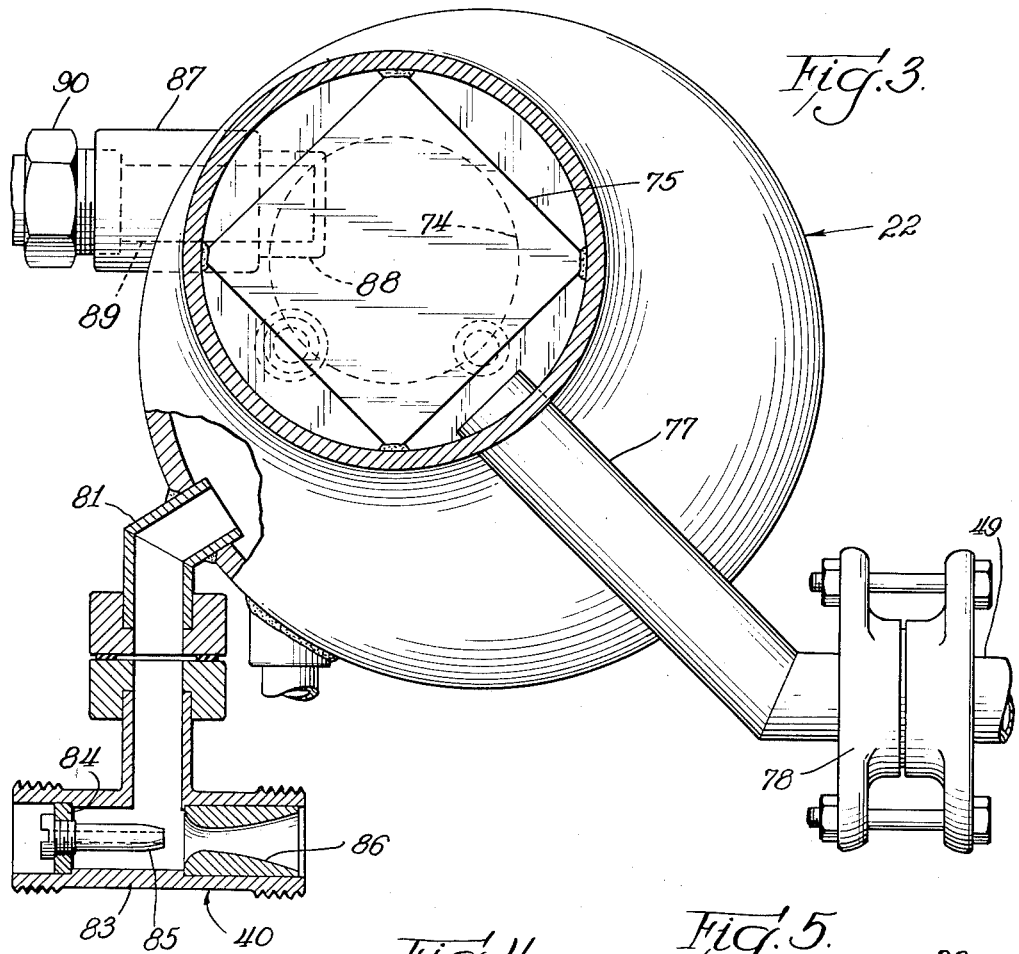
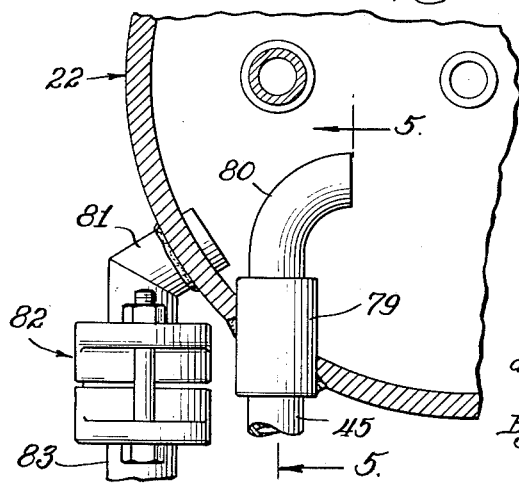
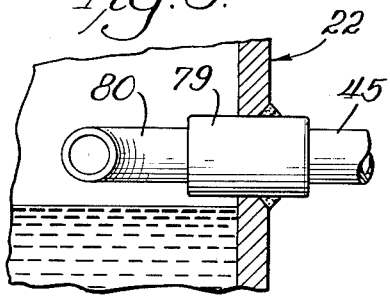
Inventors
Jess G. Arganbright
and John C. Walsh
By E. Manning Giles
Att'y

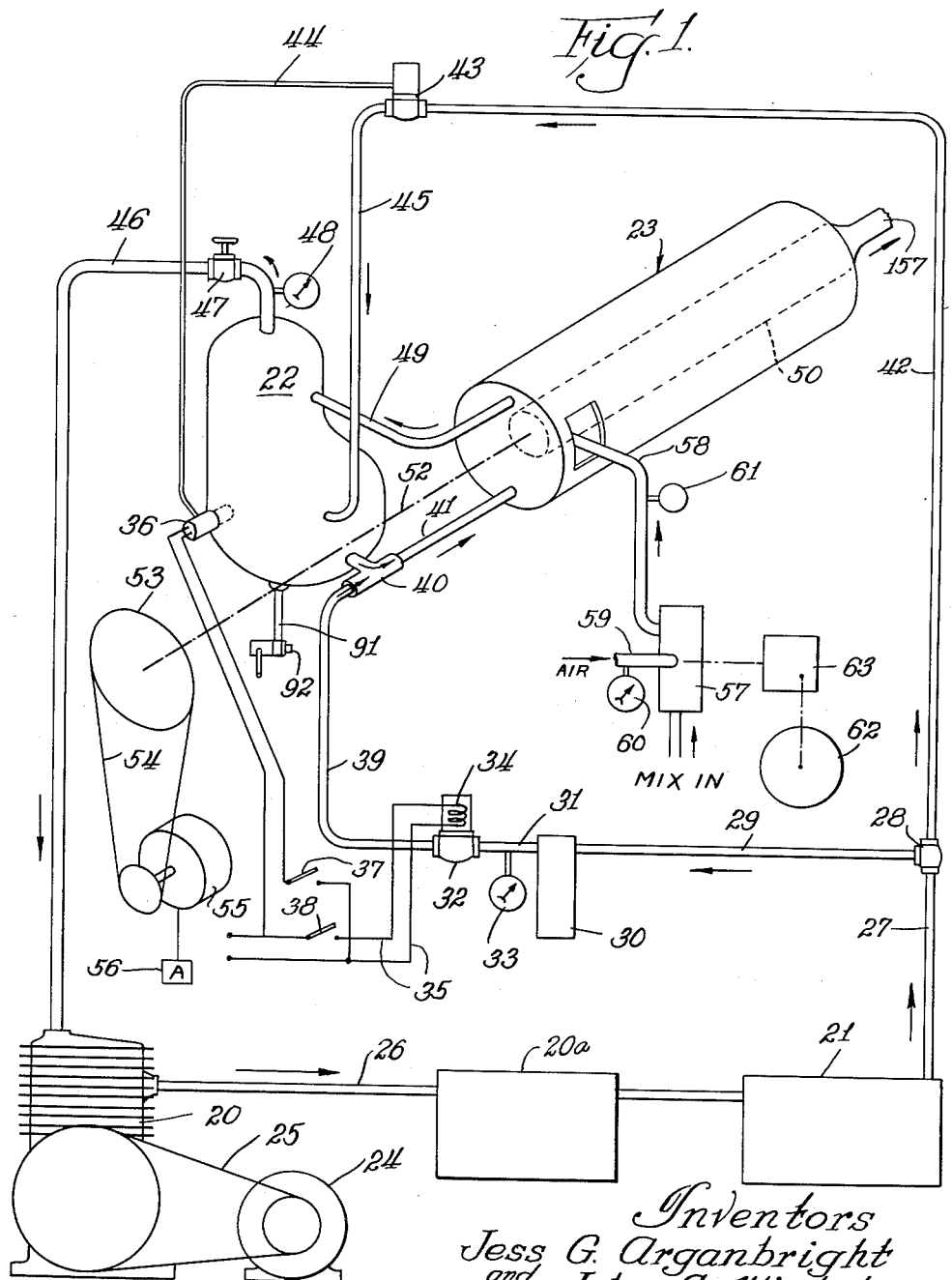

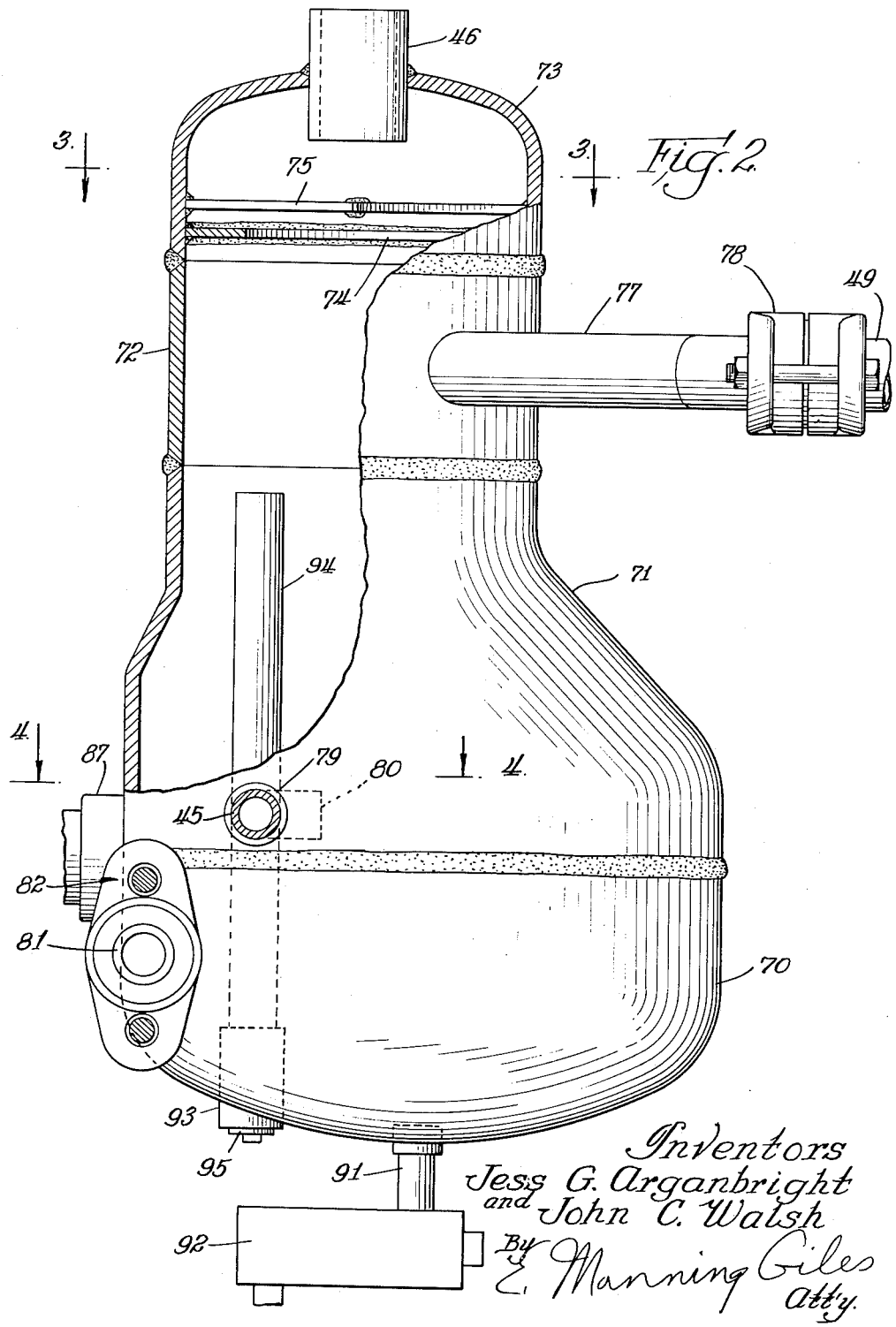

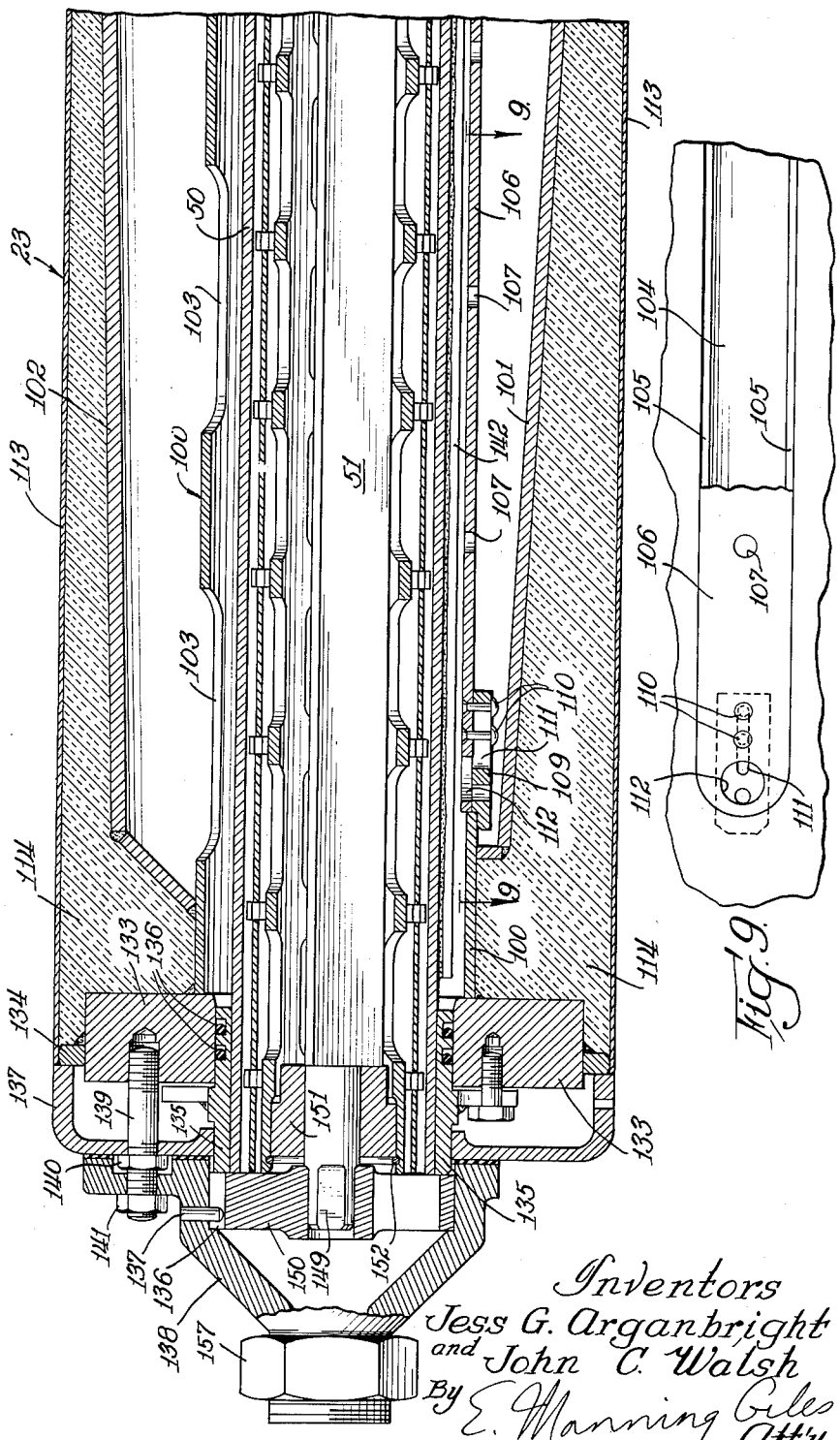

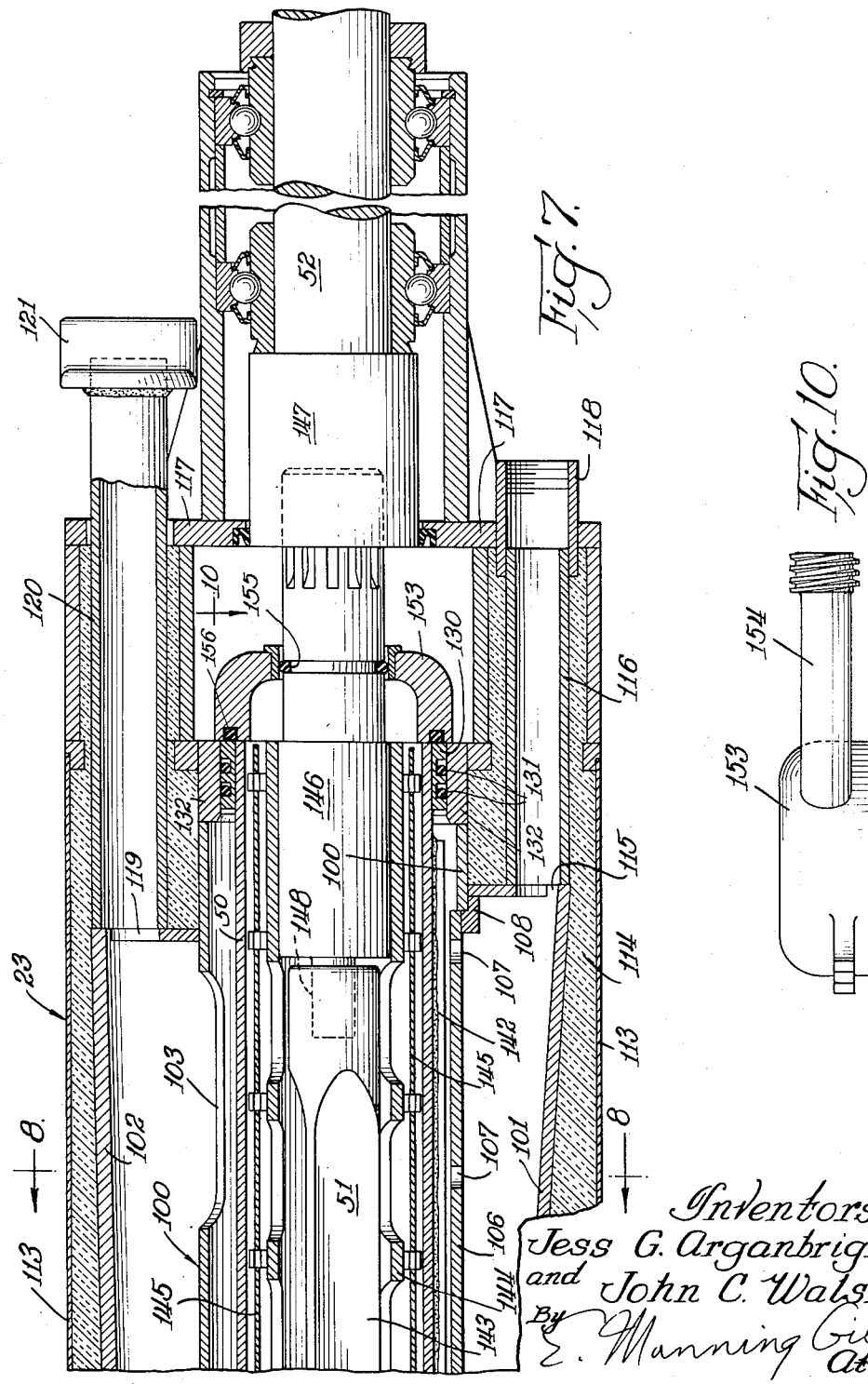

July 3, 1962 J. G. ARGANBRIGHT ET AL 3,041,854
REFRIGERATION SYSTEM FOR HEAT EXCHANGERS
Filed April 15, 1957 6 Sheets-Sheet 6
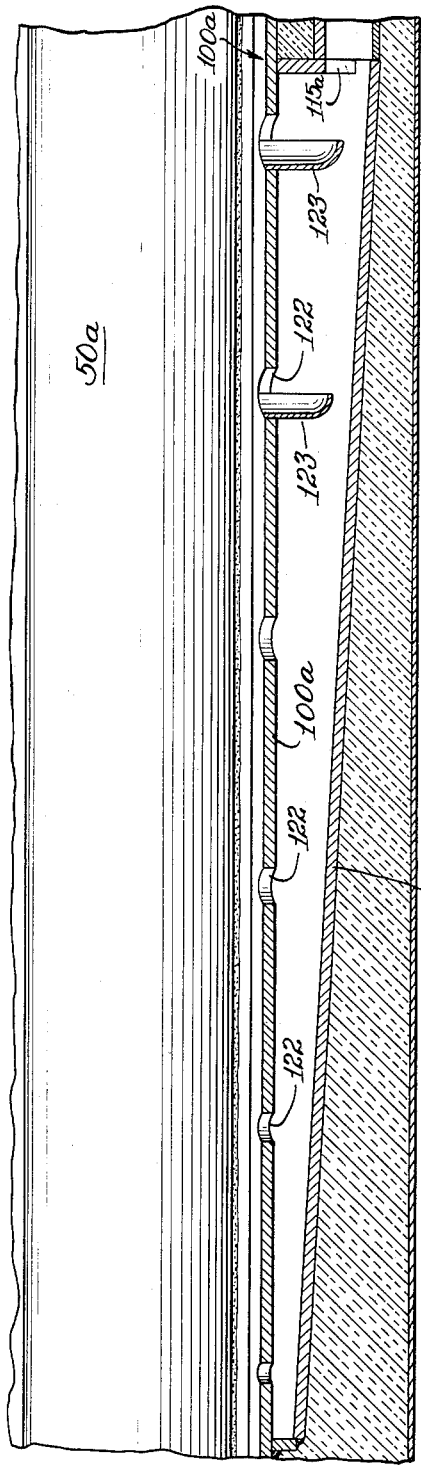
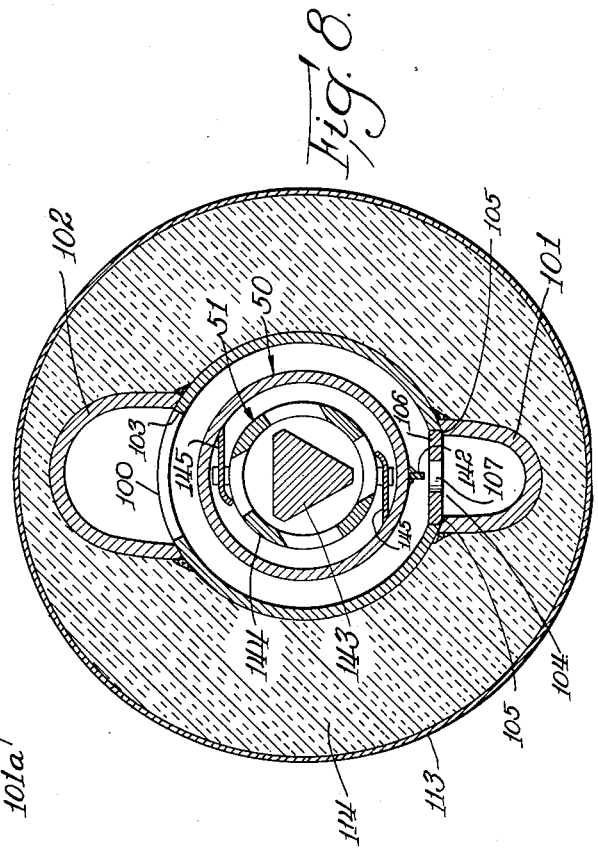
Inventors
Jess G. Arganbright
and John C. Walsh
By E. Manning Giles
Atty.

United States Patent Office 3,041,854
Patented July 3, 1962

3,041,854
REFRIGERATION SYSTEM FOR HEAT EXCHANGERS
Jess G. Arganbright and John C. Walsh, Cedar Rapids, Iowa, assignors to Cherry-Burrell Corporation, Chicago, Ill., a corporation of Delaware
Filed Apr. 15, 1957, Ser. No. 652,840
2 Claims. (Cl. 62—527)

Our invention relates to an ammonia or Freon refrigeration system and has reference more particularly to such a system in combination with agitator-type heat exchange equipment such as continuous ice cream freezers.

Heretofore, continuous ice cream freezers have commonly employed the so-called semi-flooded type ammonia refrigeration systems. In these systems, the ice cream freezing tube is surrounded by a jacket forming a refrigerant space therebetween, and ammonia or Freon is maintained in that space at a height sufficient to substantially submerge the freezing tube. An oversupply of the refrigerating medium is circulated to the refrigerant space surrounding the freezing tube in order to maintain the tube-submerging liquid level, and this results in constant spill-back of some of the refrigerating medium into the gas return, thus reducing the efficiency of the system.

Moreover, in the semi-flooded system, the heat transfer through the freezing tube converts contiguous liquid refrigerant into gas, thus forming many gas bubbles around the outer surface of the tube. These bubbles tend to insulate the tube from direct liquid contact and this impairs heat transfer efficiency.

It is the primary object of our invention to provide a system in which liquid refrigerant is applied to the external surface of the freezing tube in the form of a spray so as to eliminate the overflow of liquid refrigerant into the gas return, such as in encountered with the semi-flooded systems.

It is another object of our invention to develop a new refrigeration system in which space is available for immediate escape of gas as it is formed upon contact of liquid refrigerant with the freezing tube, thus avoiding the tendency of bubbles to adhere to and partially insulate the tube.

It is a further object of our invention to devise a refrigeration system that requires a relatively small amount of refrigerant, thus permitting use of components of reduced size and capacity.

It is a still further object of our invention to design a system which is simple, economical, and relatively trouble-free, these and other objects being accomplished as hereinafter described, reference being had to the accompanying drawing in which FIG. 1 is a diagrammatic representation of a refrigeration system embodying our invention;

FIG. 2 is a view of the accumulator member of our refrigeration system, with portions removed to show the interior;

FIG. 3 is a view on the line 3—3 of FIG. 2;
FIG. 4 is a view on the line 4—4 of FIG. 2;
FIG. 5 is a view on the line 5—5 of FIG. 4;

FIG. 6 is a vertical sectional view through the discharge end of a freezing tube around which the evaporator casing of our refrigeration system is disposed;

FIG. 7 is a similar vertical sectional view through the inlet end of the freezing tube and evaporator shown in FIG. 6;

FIG. 8 is a view on the line 8—8 of FIG. 7;
FIG. 9 is a view on the line 9—9 of FIG. 6;
FIG. 10 is a side view of a fitting through which ice cream mix is admitted to the freezing tube, the view being taken on a plane indicated by 10 in FIG. 7; and FIG. 11 is a view similar to the lower portion of FIGS. 6 and 7 showing a modified form of manifold and insert strip for liquid refrigerant.

Referring now to the drawing, and particularly to FIG. 1, the principal components of our new refrigeration system are the compressor, designated generally by the reference numeral 20, a condenser 20a, a liquid refrigerant supply tank or receiver 21, an accumulator 22, and an evaporator 23.

The compressor 20 is of the type commonly used in refrigeration systems and is driven by a motor 24 through a drive belt 25. The high side of the compressor 20 is connected to the condenser 20a and then to the receiver 21 by means of a duct 26. An outlet duct 27 leads from the receiver 21 to a T 28. A duct 29 leading from the lateral branch of the T 28 is connected with a pressure reducing valve 30. A short duct 31 leads from the pressure reducing valve 30 to a solenoid valve 32, and a pressure gauge 33 is connected to the duct 31 therebetween. The coil 34 of the solenoid valve 32 is connected as shown in FIG. 1 through the wires 35 with the thermo coil resistance heater 36 in the accumulator 22. Switches 37 and 38 are provided in the circuit 35 between the solenoid coil 34 and the resistance heater 36, said switches 37 and 38 being located on a control panel (not shown). A duct 39 leads from the solenoid valve 32 to a jet assembly 40 on the accumulator 22, and the jet assembly 40 is connected through a duct 41 to the evaporator 23.

The straight through branch of the T 28 is connected to a duct 42 which leads to a thermo valve 43 which, in turn, is operatively connected by means of a capillary tube 44 to the resistance heater 36 in the accumulator 22.

A duct 45 communicates at one end through the thermo valve 43 with the duct 42, the other end of said duct 45 being connected to the accumulator 22. A suction line 46 with a back pressure valve 47 therein leads from the accumulator 22 to the low side of the compressor 20. A back pressure gauge 48 is connected to the suction line 46 between the accumulator 22 and the back pressure valve 47.

A return duct 49 leads from the evaporator 23 to the accumulator 22 to return gaseous refrigerant from the evaporator 23 for recompression in the compressor 20 and recirculation to the evaporator 23 in liquid form.

*Evaporator*

Our refrigeration system is shown herein in combination with an agitator-type heat exchanger such as a continuous ice cream freezer. In this embodiment, the evaporator 23 comprises a jacket enclosing a freezing tube 50. An agitator dasher 51, shown in FIGS. 6 and 8, is rotatably mounted within the freezing tube 50 and is driven by a drive shaft 52 shown in FIG. 7 and represented by the broken line 52 in FIG. 1. One or more sheaves 53, to which the drive shaft 52 is connected, are driven by V-belts 54 which in turn are operated by a motor 55. An ammeter 56 mounted on a remote control panel (not shown) is connected to the motor 55 to indicate the load on the motor 55 when it is in operation.

The product to be frozen in the freezing tube 50, such as ice cream mix, is supplied to said tube 50 through an infeed duct 58 from a positive pump 57, preferably of the type disclosed in the pending patent application of John C. Walsh, Serial No. 601,863, filed August 3, 1956, now Patent No. 2,944,487. The pump 57 may incorporate air with the liquid ice cream mix, air being admitted through an air duct 59. A suction gauge 60 is provided on the air duct 59 and a pressure gauge 61 is connected to the infeed duct 58 to the freezing tube 50. The pump 57 is driven by a motor 62, preferably through a variable reducer 63.

Accumulator

The accumulator 22 is shown generally in FIG. 2 with a portion broken away to show part of the interior, detailed views being provided in FIGS. 3, 4, and 5.

The accumulator 22 comprises a somewhat pear-shaped casing and is provided with a pan-shaped base 70 which serves as a refrigerant reservoir. The base 70 is welded to the lower and large end of a reducer 71, a cylindrical section 72 being welded to the upper end of the reducer 71. Finally, a cap 73 is welded on the top of the cylindrical section 72. This assembly of the base 70, reducer 71, cylindrical section 72, and cap 73, constitute the casing of the accumulator 22.

Baffle plates 74 and 75 are provided in the cap 73, the lower baffle plate 74 having a central circular opening 76 and the upper baffle plate 75 being generally square in form. The circular baffle 74 is welded peripherally to the inner wall of the cap 73 and the square baffle 75 is welded thereto at each of its four corners as shown in FIG. 3. The baffles 74 and 75 are preferably spaced approximately one-half inch apart, although the distance is not critical, the purpose being to provide an indirect flow path for refrigerant gas passing from the interior of the accumulator 22 to the suction line 46 leading to the low side of the compressor 20.

A gas duct 77 is connected to the return duct 49 by means of a flange union 78 and projects through the wall of the cylindrical section 72 of the accumulator 22 and is welded peripherally to the wall. Refrigerant gas returning from the evaporator 23 to the accumulator 22 is likely to have particles of liquid refrigerant entrained therewith and, as the gas passes upwardly through the accumulator 22, the liquid droplets tend to adhere to the baffles 74 and 75, and the liquid then drips back into the base 70 of the accumulator 22.

Liquid refrigerant from the duct 45 is supplied to the accumulator 22 through a coupling 79 to which it is connected. The coupling 79 protrudes through the wall of the reducer 71 and is welded thereto, said coupling 79 being provided at its inner end with a short length of pipe 80 curved at about right angles in a horizontal plane, the open end serving as a liquid refrigerant discharge port. Liquid refrigerant discharged from said length of pipe 80 accumulates in the base of the accumulator 22, preferably to a level slightly below the coupling 79 as shown in FIG. 5.

One end of an angularly bent outlet pipe 81 projects through the wall of the base 70 of the accumulator 22 as shown in FIGS. 3 and 4. At its other end, the outlet pipe 81 is connected to a flange union 82, which in turn is connected to the lateral branch of a modified T 83 which forms a part of the jet assembly 40. An orifice plate 84 engaged in one end of the T 83 is threaded internally to receive an externally threaded nozzle 85 as shown in FIG. 3. The nozzle 85 projects toward a venturi insert 86 mounted in the other end of the T 83. The discharge end of the nozzle 85 is disposed opposite the lateral branch of the T 83 in such a manner that when a stream of liquid is discharged at high velocity from the nozzle 85 toward the venturi 86, it tends to carry along a considerable volume of liquid from the liquid reservoir in the base 70 of the accumulator 22.

At approximately the juncture between the base 70 and the reducer 71, the accumulator 22 is provided with a coupling 87 which projects through the wall of said accumulator 22 as shown in FIG. 3 at a level which may be seen more clearly in FIG. 2. A stub length of pipe 88 protrudes from the inner end of the coupling 87 into the accumulator 22 to serve as an annular shield for the free end of a bulb 89 which is mounted in a reducer 90 and projects into the accumulator 22. The bulb 89 is part of a level control device, it being our preference to use a unit sold under the tradename of "Sporlan." The bulb 89 contains a 15 watt heater, the bulb 89 being filled with ammonia, partly in liquid form, which surrounds the heater. The bulb 89 is connected by means of a capillary tube 44 with the thermo valve 43. Thus when the heater in the bulb 89 heats the ammonia sufficiently to convert the liquid to gas, the gas exerts pressure through the capillary tube 44 on the thermo valve 43 to open it. When the bulb 89 is cooled such as by immersion in liquid refrigerant, the ammonia in the bulb 89 is cooled and forms liquid, thus reducing the pressure in the capillary tube 44 and permitting the thermo valve 43 to close.

The base 70 of the accumulator 22 is provided with a purge outlet comprising a downwardly projecting purge duct 91 with a purge valve 92 at the lower end thereof to permit draining oil out of the accumulator 22, this being required at frequent intervals in ammonia-type refrigeration systems because of the tendency for oil to accumulate in the ammonia.

At one side of the purge duct 91, the accumulator 22 may be provided with an upstanding coupling 93 secured in the base 70, a standpipe 94 being engaged in the coupling 93 and projecting upwardly within the accumulator 22 to a point near the juncture between the reducer 71 and the cylindrical section 72. The coupling 93 should be provided with a removable plug 95 engaged in the lower end as indicated by the dotted lines in FIG. 2. The function of the standpipe is to provide means for connecting into the refrigeration system where that is desire, such as to withdraw gas from the system. Thus when liquid refrigerant is being drained from accumulator 22 through the purge valve 92 to a still (not shown) so as to permit separating out the oil by distillation, the refrigerant gas may be returned to the system by removing the plug 95 and connecting onto the coupling 93. The compressor 20 then serves to withdraw the refrigerant gas through the standpipe 94, the accumulator 22, and the suction line 46.

Evaporator

The evaporator 23 of FIG. 1 is shown in detail in FIGS. 6 and 7 and comprises the combination of the freezing tube 50 and a cylindrical casing 100 within which the freezing tube 50 is telescoped to provide an annular space therebetween.

A channel-shaped liquid refrigerant manifold 101 extends longitudinally along the bottom of the evaporator casing 100 and a diametrically opposed gas exhaust manifold 102 extends longitudinally along the top of the casing 100. Elongated openings 103 are provided in the top wall of the casing 100 to provide communication from the aforesaid annular space between the tube 50 and casing 100 to the gas exhaust manifold 102.

Along the bottom of the casing 100, a longitudinal slot 104 is provided to communicate with the liquid manifold 101, the slot 104 being substantially the same length as the manifold 101. The slot 104 is preferably slightly wider than the inside width of the channel-shaped liquid manifold 101, the latter being joined to the casing 100 as shown in FIGS. 8 and 9 in a manner to provide a ridge or shoulder 105 along each side of the slot 104. An insert strip 106 of substantially the same length and width as the slot 104 is seated on the shoulders 105, the strip 106 being provided with spaced perforations 107. The perforations 107 may be of any desired size, number, and spacing, although we have found that five or six holes about $11/32$ of an inch in diameter and spaced about equidistant apart will give good results.

The strip 106 has a projecting lug 108 at one end which hooks under the casing 100 at one end of the slot 104. At its opposite end, the strip 106 is provided with a sliding tongue 109 which is secured to the underside of the strip 106 by means of guide pins 110, said pins 110 projecting through a longitudinal slot 111 in said tongue 109. In its extended position, the tongue 109 engages under the casing 100 to lock the strip 106 in place. When the tongue 109 is retracted, the strip is removable from the slot 104. A hole 112 is preferably provided in the strip 106 over the tongue 109 so that a tool can be inserted through the hole 112 to manipulate the tongue 109.

The function of the perforate strip 106 is to permit liquid refrigerant entering the manifold 101 at high velocity to discharge into the annular space between the freezing tube 50 and the cylindrical casing 100. The velocity of the liquid refrigerant passing through the perforations 107 and its impact against freezing tube 50 causes droplets and spray particles of refrigerant to impinge on the outer wall of said tube 50.

The casing 100 and the manifolds 101 and 102 are enclosed within a cylindrical shell 113, the space therebetween being filled with suitabel insulation 114. In a preferred form the insulation 114 is a foamed plastic such as may be provided in an enclosed space by inserting a predetermined quantity of expandable polystyrene beads and then foaming the beads by injecting steam into the confined space, although it is to be understood that any other form of suitable insulation may be employed.

The inlet port 115 of the liquid refrigerant manifold 101 is connected through a duct 116 projecting to the inlet end wall 117 of the shell 113 and the coupling 118 projecting through said wall 117 to the duct 41 from the jet assembly 40.

The outlet port 119 from the gas exhaust manifold 102 is connected by a duct 120 passing through the end wall 117 and a flange union 121 with the return duct 49 to the accumulator 22.

A modified form of liquid refrigerant manifold is shown in FIG. 111 wherein the cylindrical casing 100a is provided with longitudinally spaced holes 122 communicating with the interior of the liquid manifold 101a, the holes 122 ranging in size from about one inch in diameter near the inlet port 115a to approximately ⅓ inch in diameter. Some or all of said holes 122 may be provided with downwardly depending shell-shaped skirts 123 at their downstream sides, the skirts 123 being disposed in the refrigerant flow path to divert refrigerant upwardly through the holes 122 into the annular space surrounding the freezing tube 50a. The larger holes 122 are provided near the inlet end of the freezing tube 50 since that is where the ice cream mix is introduced into the tube 50 and thus that is where the maximum chilling is required.

While this modified arrangement is shown as being incorporated directly in the bottom wall of the casing 100a, it will be understood that the same arrangement could be used with the insert strip 106 heretofore described. Likewise, the arrangement of perforations 107 in the previously described insert strip 106 could be incorporated in the wall of the casing 100 itself.

Freezing Tube

In accordance with usual practice, the freezing tube 50 is preferably made of nickel because of that metal's high heat tranfer rate and because of its being impervious to ammonia. The inner surface of the tube 50, however, is preferably plated with hard chrome in order to resist wear from continual rotation of scraper blades.

In our improved freezer, we have developed mounting means which permit removal of the freezing tube 50 to facilitate cleaning. Thus in the preferred form the freezing tube 50 is provided at its inner end with a rear mounting collar 130 as shown in FIG. 7, the mounting collar 130 having spaced circumferential grooves to receive O-rings 131 which engage in sealing relation with the collar 132 of reduced diameter at the inner end of the cylindrical casing 100.

The outer end of the casing 100 is provided with a relatively thick annular end wall 133 as shown in FIG. 6, the end wall 133 being welded to the casing 100 and being provided with an annular extension 134 which engages the inner periphery of the shell 113. The outer end of the freezing tube 50 is provided with a ferrule 135 which has two circumferential grooves in which O-rings 136 are seated, said O-rings 136 being compressed in sealing relation by engagement with the inner circumference of the end wall 133.

An annular freezing tube head 137 is secured to the outer end of the shell 113 and has engaged thereon an ice cream discharge cap 138, the cap 138 being held in engagement with the head 137 and the latter with the shell 113 by means of spaced studs 139, one of which is shown at the top of the assembly in FIG. 6. The studs 139 are engaged in the end wall 133 and project through the head 137 and cap 138, the latter being held in place by nuts 140 and 141.

The freezing tube 50 is preferably provided with a downwardly depending longitudinal drip strip 142 along the bottom of the tube 50. Oil entrained in the liquid refrigerant tends to adhere to the exterior of the freezing tube 50 and to run down along the sidewalls thereof to the lowest point. Since in our construction that is the drip strip 142, the oil accumulates there, thus preventing the formation of an oil coating along the bottom of the tube 50 with resultant loss of heat transfer efficiency. Then when the tube 50 is removed, it is a simple matter to clean the accumulation of oil off of the drip strip 142.

A dasher 51 is disposed in the freezing tube 50 and may be one of the dasher types disclosed in Weinreich et al. Patent No. 2,278,340, granted March 31, 1942, although any other suitable dasher may be employed. In our preferred construction, the dasher 51 comprises a fixed inner element 143 of triangular cross-section, a rotative tubular agitator 144 engaged coaxially therearound, and two scraper blades 145 mounted longitudinally on the agitator 144 as shown in FIG. 8 in a manner to scrape ice cream mix off the inner wall of the freezing tube 50 during operation.

A stub shaft 146 is engaged at one end in the tubular agitator 144 and is provided with a splined extension as shown in FIG. 7 which engages by means of a slide fit in the internally splined coupling 147 at the end of the drive shaft 52. The stub shaft 146 has an axial pivot pin 148 projecting from the side opposite the splined extension, the pin 148 being journaled in a bearing formed in the end of the inner member 143 of the dasher 51.

At its opposite end, the inner member 143 has an axial stem 149 of square cross section which projects into a square socket in the spider 150, thus preventing rotation of the inner member 143. The spider 150 which is engaged in the cap 138, has an axial bearing 151 projecting into the tubular agitator 144, the bearing 151 serving as a pivot engaged by the tubular agitator 144. The bearing 151 has a circumferential groove and the agitator 144 has a complementary internal groove, a snap ring 152 being seated in the two to preserve axial alignment.

The mix inlet fitting 153 shown in FIG. 10 is a somewhat pan-shaped unit with a tubular handle-like projection 154 which projects laterally past the shell 113 and is connected to the infeed duct 58 of FIG. 1 through which a mixture of liquid ice cream mix and air or gas in predetermined proportions is pumped to the freezing tube 50. The fitting 153 is disposed on its side facing the front of the freezing tube 50, and it has a central opening which encircles the stub shaft 146, said shaft 146 being provided with a circumferential groove in which an O-ring 155 is seated and engaged in sealing relation with fitting 153. The circumferential edge of the fitting 153 is engaged in butting relation against the end of the freezing tube 50 and the mounting collar 130, a gasket or O-ring 156 being interposed therebetween as shown in FIG. 7. Thus, mix under pressure is pumped into the freezing tube 50 through the annular space between the inner wall of the freezing tube 50 and the tubular agitator 144.

Frozen mix or "plastic" ice cream is discharged from the opposite end of the freezing tube 50 through a coupling 157 which projects from the mix outlet cap 138. Suitable connections may be made to this coupling 157 to discharge the plastic ice cream material through suitable nozzles, or a number of similar freezing tubes 50 may be connected together through couplings 157 to combine their output.

*Operation*

We place our refrigeration system in operation by first starting the compressor 20. We then energize the thermo coil 36 by closing the switch 37. As the thermo coil 36 heats up, it vaporizes the ammonia in the bulb 89 which builds up pressure in the capillary tube 44 sufficient to open the thermo valve 43. The opening of the valve 43 permits liquid refrigerant to pass through the supply line 45 to the accumulator 22.

When the liquid refrigerant in the accumulator 22 reaches the level of the bulb 89, it cools the ammonia therein sufficiently to convert the gas back to liquid, thus reducing the pressure in the capillary tube 44 and closing the thermo valve 43. Thus the accumulator 22 is supplied with liquid refrigerant to an operating level.

The next step in start-up is to turn on the mix pump 57 which supplies commingled liquid ice cream mix and air to the freezing tube 50. As soon as liquid mix begins to run out of the discharge coupling 157—indicating that the freezing tube 50 is partially filled—the mix pump 57 is shut off and motor 55 is turned on to place the dasher 51 in operation.

Next, the switch 38 is closed which opens the solenoid valve 32, thus permitting liquid refrigerant to pass through the duct 39 to the jet assembly 40 and to the evaporator 23. The liquid refrigerant is maintained by the pressure reducing valve 30 at a steady pressure of about 65 lbs. p.s.i. As the refrigerant passes through the jet assembly 40, it entrains about five times its volume of liquid refrigerant from the accumulator 22 and carries it at a rate of about 181 feet per second to the liquid manifold 101. The liquid refrigerant tends to flow up through the perforations 107 with sufficient velocity to create turbulence within the casing 100, thus causing impingement of refrigerant spray on the walls of the freezing tube 50. As the spray particles evaporate, the gas escapes through the openings 103 into the gas exhaust manifold 102. The refrigerant gas passes via the return duct 49 to the accumulator 22 and then via the suction line 46 to the compressor 20.

As the liquid mix in the freezing tube 50 becomes chilled through action of the refrigerant on the exterior of the tube, it begins to freeze and harden, thus imposing more load on the agitator 51 and its motor 55. The load is indicated on the ammeter 56, and when the ammeter indicates increased load, the mix pump 57 should be re-started to resume feeding liquid mix to the freezing tube 50. The tube 50 then begins to discharge ice cream from the coupling 157.

We have shown our improved refrigeration system in a preferred form as employed with an ice cream freezer, but it should be understood that the system is highly versatile and adaptable in modified form to a wide variety of applications in line with the spirit of our invention, the scope of which is determined by the appended claims.

We claim:

1. In a refrigeration system of the class described, an evaporator comprising the combination of a horizontally disposed tubular member through which a product to be cooled may be passed, an outer shell spaced from and enclosing said tubular member to form a chamber therebetween, an inlet manifold disposed on the lower side of said shell along substantially the entire length thereof, the portion of said shell covered by said inlet manifold having a plurality of orifices throughout its length providing communication between said manifold and chamber, an outlet manifold disposed on the upper surface of said shell, at least one port in said shell providing the communication between said chamber and outlet manifold, and means for supplying liquid refrigerant to said inlet manifold at a velocity sufficiently high to cause refrigerant particles to impinge on the outer surface of said tubular member.

2. In a refrigeration system of the class described, an evaporator comprising the combination of a horizontally disposed tubular member through which a product to be cooled may be passed, a cylindrical outer shell spaced from and enclosing said tubular member to form an annular chamber therebetween, said shell having an elongated slot on its lower side along substantially the entire length thereof, an inlet manifold disposed on said shell over said slot, an insert strip removably received in said slot, said strip having a plurality of orifices spaced throughout its length providing communication between said inlet manifold and said annular chamber, an outlet manifold disposed on the upper surface of said shell, at least one port in the upper surface of said shell providing communication between said chamber and outlet manifold, and means for supplying liquid refrigerant to said inlet manifold at a velocity sufficiently high to cause refrigerant particles to impinge on the outer surface of said tubular member.

References Cited in the file of this patent

UNITED STATES PATENTS

| | | |
|---|---|---|
| 2,094,354 | Genova | Sept. 28, 1937 |
| 2,278,340 | Weinreich et al. | Mar. 31, 1942 |
| 2,282,862 | Genova | May 12, 1942 |
| 2,859,596 | Evans | Nov. 11, 1958 |

FOREIGN PATENTS

| | | |
|---|---|---|
| 685,912 | Germany | Dec. 29, 1939 |